United States Patent
Zhang et al.

(10) Patent No.: US 12,554,329 B2
(45) Date of Patent: Feb. 17, 2026

(54) VIBRATION NOISE PROCESSING METHOD AND APPARATUS, DEVICE, AND READABLE STORAGE MEDIUM

(71) Applicant: AAC Acoustic Technologies (Shanghai) Co., Ltd., Shanghai (CN)

(72) Inventors: Lijin Zhang, Shanghai (CN); Xiuyue Wang, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 167 days.

(21) Appl. No.: 18/391,615

(22) Filed: Dec. 20, 2023

(65) Prior Publication Data

US 2024/0338079 A1 Oct. 10, 2024

Related U.S. Application Data

(63) Continuation of application No. PCT/CN2023/087333, filed on Apr. 10, 2023.

(51) Int. Cl.
*G06F 3/16* (2006.01)
*G06F 3/01* (2006.01)
*G06F 3/041* (2006.01)

(52) U.S. Cl.
CPC .......... *G06F 3/016* (2013.01); *G06F 3/0416* (2013.01); *G06F 3/167* (2013.01)

(58) Field of Classification Search
CPC ......... G06F 3/016; G06F 3/0416; G06F 3/167
See application file for complete search history.

(56) References Cited

U.S. PATENT DOCUMENTS

| | | | |
|---|---|---|---|
| 2012/0062491 A1* | 3/2012 | Coni | G06F 3/03547 345/173 |
| 2014/0119569 A1* | 5/2014 | Peeler | H04M 1/724 381/94.1 |
| 2016/0109949 A1* | 4/2016 | Park | G06F 3/0416 345/173 |
| 2018/0350339 A1* | 12/2018 | Macours | B06B 1/0253 |
| 2019/0261088 A1* | 8/2019 | Sheffield | G10K 11/17883 |

FOREIGN PATENT DOCUMENTS

JP 2011146006 A * 7/2011

* cited by examiner

*Primary Examiner* — Joseph Saunders, Jr.
(74) *Attorney, Agent, or Firm* — Wiersch Law Group

(57) ABSTRACT

A vibration noise processing method and apparatus, and a readable storage medium. The method includes: controlling a noise reduction component to collect vibration noise signal of a vibration component; generating a corresponding noise reduction control parameter according to signal characteristic index of the vibration noise signal; and controlling the noise reduction component to output corresponding reverse sound-wave signal. The reverse sound-wave signal has a frequency and an amplitude identical to the vibration noise signal and the reverse sound-wave signal has a phase opposite to the vibration noise signal. According to a vibration noise signal actually generated by the vibration component, the noise reduction component is controlled to output the corresponding reverse sound-wave signal to offset vibration noise in sound field, which prevents sound interference caused by vibration noise and meets vibration experience of the users, and thereby providing better auditory comfort experience for the users.

5 Claims, 5 Drawing Sheets

VIBRATION NOISE PROCESSING METHOD AND APPARATUS, DEVICE, AND READABLE STORAGE MEDIUM

TECHNICAL FIELD

The present disclosure relates to the technical field of acoustics and, in particular, to the technical field of noise reduction. Specifically, the present disclosure discloses a vibration noise processing method and apparatus, a device, and a readable storage medium.

BACKGROUND

With peoples' pursue on higher quality of life, users' requirements on experience for terminal devices are becoming higher. The users' requirements on experience mainly cover vision, hearing, taste, smell, touch, and the like. The requirements on haptic experience for the terminal devices may be met through design of structural vibration characteristics. However, in practical applications, the terminal devices generally stimulate sound-wave signals when meeting the users' haptic experience through vibration provided by a vibration structure. Part of the sound-wave signals may be transmitted to human ears and bring bad hearing experience to the users. That is, it is difficult for current terminal devices to meet the requirements on vibration experience and auditory comfort experience of the users at the same time.

It is to be noted that the technologies described in this portion are not necessarily those previously envisioned or employed. Unless otherwise indicated, it should not be assumed that any technology described in this portion belongs to related art merely by virtue of its brief illustration in this portion. Therefore, unless otherwise indicated, the issues mentioned in this portion should not be considered to be well known in the related art.

SUMMARY

The present disclosure provides a vibration noise processing method and apparatus, a device, and a readable storage medium, which can solve at least the above problem in the related art that it is difficult for the terminal devices to meet the requirements on vibration experience and auditory comfort experience of the users at the same time.

In order to solve the above technical problem, in a first aspect of the present disclosure, a vibration noise processing method is provided, applied to a terminal device including a vibration component and a noise reduction component, the vibration noise processing method includes: controlling, when the vibration component is in a vibration operating state, the noise reduction component to collect a vibration noise signal of the vibration component; generating a corresponding noise reduction control parameter according to a signal characteristic index of the vibration noise signal; and controlling, according to the noise reduction control parameter, the noise reduction component to output a corresponding reverse sound-wave signal. The reverse sound-wave signal has a frequency and an amplitude identical to the vibration noise signal, and the reverse sound-wave signal has a phase opposite to the vibration noise signal.

In a second aspect of the present disclosure, a vibration noise processing apparatus is provided, applied to a terminal device including a vibration component and a noise reduction component, the vibration noise processing apparatus includes: a first control module configured to control, when the vibration component is in a vibration operating state, the noise reduction component to collect a vibration noise signal of the vibration component; a generation module configured to generate a corresponding noise reduction control parameter according to a signal characteristic index of the vibration noise signal; and a second control module configured to control, according to the noise reduction control parameter, the noise reduction component to output a corresponding reverse sound-wave signal. The reverse sound-wave signal has a frequency and an amplitude identical to the vibration noise signal, and the reverse sound-wave signal has a phase opposite to the vibration noise signal.

In a third aspect of the present disclosure, a terminal device is provided, including: a vibration component, a noise reduction component, a memory, and a processor. The processor is configured to execute a computer program stored in the memory, and the processor, when executing the computer program, implements steps in the vibration noise processing method provided in the first aspect of the present disclosure.

In a fourth aspect of the present disclosure, a computer-readable storage medium is provided, storing a computer program, when the computer program is executed by a processor, steps in the vibration noise processing method provided in the first aspect of the present disclosure are implemented.

As can be seen, according to the vibration noise processing method and apparatus, the device, and the readable storage medium provided in the present disclosure, when the vibration component is in a vibration operating state, the noise reduction component is controlled to collect a vibration noise signal of the vibration component. A corresponding noise reduction control parameter is generated according to a signal characteristic index of the vibration noise signal. According to the noise reduction control parameter, the noise reduction component is controlled to output a corresponding reverse sound-wave signal. The reverse sound-wave signal has a frequency and an amplitude identical to the vibration noise signal, and the reverse sound-wave signal has a phase opposite to the vibration noise signal. Through implementation of the present disclosure, according to a vibration noise signal actually generated by the vibration component, the noise reduction component is controlled to output the corresponding reverse sound-wave signal to offset vibration noise in a sound field, which prevents sound interference caused by vibration noise to users, and meets requirements on vibration experience of the users, thereby providing better auditory comfort experience for the users.

It should be understood that the content described in this section is neither intended to identify key or important features of the present disclosure, nor intended to limit the scope of the present disclosure. Other features of the present disclosure will become readily understood from the following description.

BRIEF DESCRIPTION OF DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DESCRIPTION OF EMBODIMENTS

In order to make the inventive objectives, features, and advantages of the present disclosure more understandable, the technical solutions in embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

It should be noted that, in the description of the embodiments of the present disclosure, the terms "first" and "second" are used for descriptive purposes only, which cannot be construed as indicating or implying a relative importance, or implicitly specifying the number of the indicated technical features. Therefore, the features defined with "first" and "second" may explicitly or implicitly include one or more features. In the description of the embodiments of the present disclosure, "a plurality of" means two or more, unless specifically stated otherwise.

Figure 1:
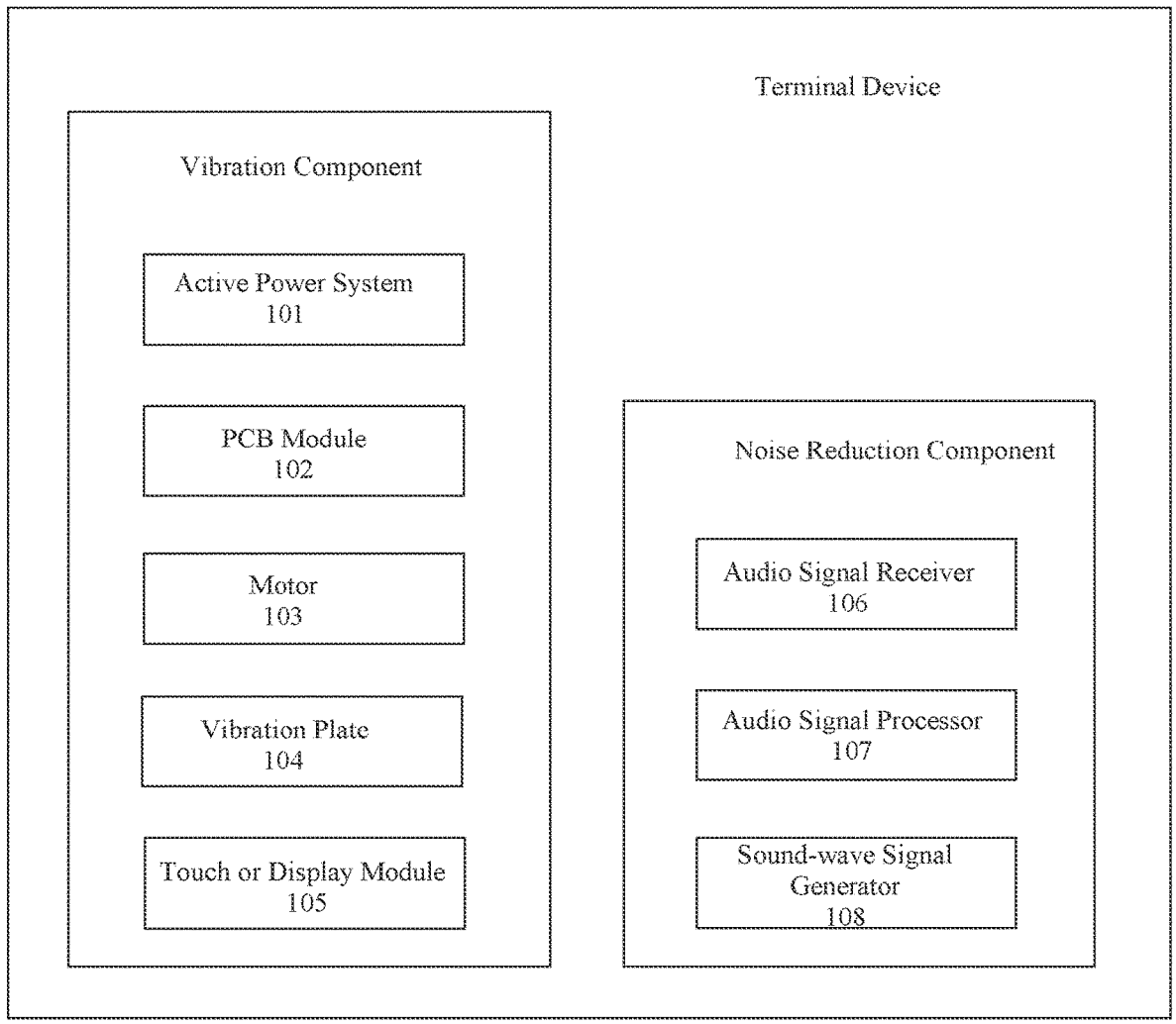
FIG. 1 is a schematic structural diagram of a hardware structure of a terminal device according to a first embodiment of the present disclosure.

In order to solve the problem in the related art that it is difficult for the terminal devices to meet the requirements on vibration experience and auditory comfort experience of the users at the same time, in a first embodiment of the present disclosure, a vibration noise processing method is provided, which is applied to a terminal device. The terminal device may include, but is not limited to, a smart phone, a tablet computer, a laptop portable computer, a desktop computer, and the like. FIG. 1 is a schematic structural diagram of a hardware structure of a terminal device provided in this embodiment. The terminal device is provided with a vibration component and a noise reduction component. In an example, the vibration component may include an active power system 101, a printed circuit board (PCB) module 102, a motor 103, a vibration plate 104, and a touch or display module 105. In another example, the noise reduction component may include an audio signal receiver 106, an audio signal processor 107, and a sound-wave signal generator 108.

It is to be noted that the vibration component in this embodiment is mainly responsible for providing vibration feedback. Based on the structure of the vibration component provided in the above optional example, the active power system 101 provides power required by the component, and when the touch or display module 105 of the vibration component receives a mechanical signal from the outside, the PCB module 102 installed at the bottom of the touch or display module 105 converts the mechanical signal into a voltage signal. The vibration component may be further provided with an operational amplifier configured to amplify power of the voltage signal, then the motor 103 is driven to reciprocate at a specific frequency (i.e., vibrate), and driven by the vibration of the motor 103, the vibration plate 104 then vibrates based on certain demand and amplitude to produce desired vibration feedback to the touch or display module 105.

It is to be further noted that the noise reduction component in this embodiment may provide a noise reduction processing function for the vibration noise signal. Optionally, the noise reduction component in this embodiment may be arranged inside the motor 103. That is, the noise reduction component may be a built-in structure of the motor 103. In practical applications, the audio signal receiver 106 is configured to receive the vibration noise signal generated by the vibration component, the audio signal processor 107 is configured to perform real-time calculation on the received vibration noise signal, and the sound-wave signal generator 108 is configured to output a sound-wave signal for noise reduction processing.

Figure 2:
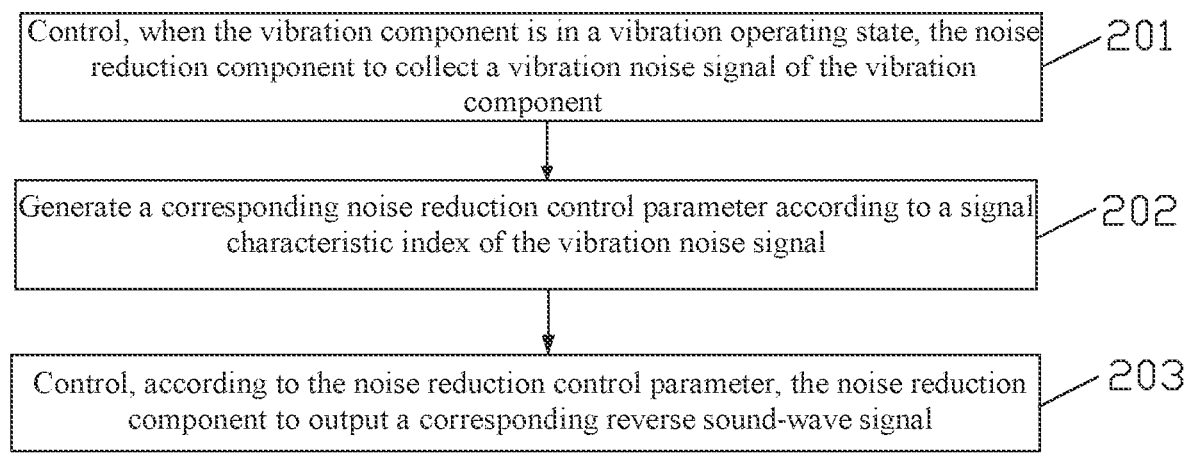
FIG. 2 is a schematic diagram of a basic process of a vibration noise processing method according to the first embodiment of the present disclosure.

FIG. 2 is a basic flowchart of a vibration noise processing method provided in this embodiment. The vibration noise processing method includes the following steps.

In step 201, when the vibration component is in a vibration operating state, the noise reduction component is controlled to collect a vibration noise signal of the vibration component.

In this embodiment, when a vibration trigger event is detected, the vibration component is triggered to enter the vibration operating state. In an optional example, when a touch event inputted for a touch screen is detected, the vibration control signal is generated based on a mechanical signal corresponding to the touch event. Then, the vibration component is triggered, based on the vibration control signal, to enter the vibration operating state.

The vibration component in this embodiment enters the vibration operating state according to a specific vibration trigger event. In a typical application scenario, the vibration component is configured to provide vibration feedback to a user's screen touch operation. Then, in practical applications, it may be determined, based on a mechanical signal when the user inputs a touch event on a touch screen/touch button, whether touch intensity is greater than a preset intensity threshold. If yes, it is determined that vibration feedback is required currently, a vibration control signal is generated, and the vibration component is triggered to enter the vibration operating state and transfers vibration to the user. It is appreciated that, the vibration trigger event in this embodiment may alternatively be a message notification event, a game achievement event, or the like. Then, a foreground running event of the terminal device may be monitored in real time. If the foreground running event matches a preset event type, the foreground running event is determined to be the vibration trigger event.

In some examples of this embodiment, prior to the step of controlling the noise reduction component to collect a vibration noise signal of the vibration component, the method further includes: acquiring a vibration trigger event that triggers the vibration component to enter the vibration operating state; determining, based on the vibration trigger event, whether a preset noise reduction control condition is met; and performing the step of controlling the noise reduction component to collect a vibration noise signal of the vibration component if the noise reduction control condition is met.

In practical applications, vibration feedback application scenarios of the vibration component may be different. That is, event types of vibration trigger events are different. In order to ensure more diverse vibration experience, the vibration component may be controlled to adaptively enter different vibration operating states according to different vibration trigger events. Then, in the different vibration operating states, vibration amplitudes and frequencies of the vibration component are different, and not all vibration noise signals generated in all vibration operating states can affect the user's auditory comfort experience. Based on this, in this embodiment, the noise reduction control condition is determined according to a current vibration trigger event. It is determined that the noise reduction control condition is met only when the vibration operating state correspondingly triggered by the vibration trigger event may affect the user's auditory comfort experience, and then a subsequent noise reduction processing is further triggered, which prevents terminal processing performance consumption caused by triggering of a noise reduction process in unnecessary scenarios.

In step 202, a corresponding noise reduction control parameter is generated according to a signal characteristic index of the vibration noise signal.

In this embodiment, there is a need to refer to the vibration noise signal to adaptively perform noise reduction processing. In practical applications, the signal characteristic index may include the amplitude value, the phase, the frequency, and the like. According to the signal characteristic index of the vibration noise signal, a signal characteristic index of the reverse sound-wave signal that offsets the vibration noise signal may be determined accordingly, and then a hardware control parameter required for outputting the reverse sound-wave signal may be generated.

In some examples of this embodiment, the step of generating a corresponding noise reduction control parameter according to a signal characteristic index of the vibration noise signal includes: comparing the signal characteristic index of the vibration noise signal with a preset critical signal characteristic index; and generating the corresponding noise reduction control parameter according to the signal characteristic index if the signal characteristic index exceeds the critical signal characteristic index.

In addition to the example of determining, according to the vibration trigger event, whether to perform the subsequent noise reduction processing process introduced above, in some other examples, whether a current vibration noise signal may affect the user's auditory comfort experience may alternatively be determined directly based on the signal characteristic index of the vibration noise signal. That is, when a signal characteristic index of the current vibration noise signal exceeds the preset critical signal characteristic index, it may be determined that the current vibration noise signal may affect the user's auditory comfort experience, and then there is a need for noise reduction processing, which further triggers the subsequent noise reduction processing process.

In step 203, according to the noise reduction control parameter, the noise reduction component is controlled to output a corresponding reverse sound-wave signal.

In this embodiment, frequencies and amplitudes of the reverse sound-wave signal and the vibration noise signal are equal, and phases of the reverse sound-wave signal and the vibration noise signal are opposite. In this embodiment, a sound field corresponding to the vibration noise signal is a primary sound field, and a secondary sound field is generated based on the reverse sound-wave signal which is equal in frequency and amplitude and opposite in phase to the vibration noise signal. Superposition of the secondary sound field and the primary sound field may achieve the purpose of offsetting the vibration noise signal and thus reducing the noise.

In some examples of this embodiment, the step of controlling, according to the noise reduction control parameter, the noise reduction component to output a corresponding reverse sound-wave signal includes: acquiring a sound-wave signal generation characteristic index of the noise reduction component; and combining the noise reduction control parameter and the sound-wave signal generation characteristic index to control the noise reduction component to output the corresponding reverse sound-wave signal.

In practical applications, in step 202, during the determination of the noise reduction control parameter, only characteristics of external noise signals of the noise reduction component are considered, but relevant characteristics of the noise reduction component are not considered. Then, based on the noise reduction control parameter, the reverse sound-wave signal that effectively cancels the vibration noise signal can only be outputted under ideal conditions. Based on this, in this embodiment, the noise reduction control parameter is further adaptively adjusted according to the sound-wave signal generation characteristic index of the noise reduction component, to obtain the adjusted noise reduction control parameter. Then, the noise reduction component is controlled, based on the adjusted noise reduction control parameter, to output the corresponding reverse sound-wave signal. In this embodiment, the sound-wave signal generation characteristic index may include, but is not limited to, a structural physical parameter, an acoustic parameter, a sound field performance index, and the like of the noise reduction component.

In some examples of this embodiment, prior to the step of controlling the noise reduction component to collect a vibration noise signal of the vibration component, the method further includes: acquiring a vibration trigger event that triggers the vibration component to enter the vibration operating state; querying a preset parameter index table based on the vibration trigger event, the parameter index table includes a mapping relationship between noise reduction control parameters and vibration trigger events; performing the step of controlling the noise reduction component to collect a vibration noise signal of the vibration component in the case of no query result; and controlling, according to the noise reduction control parameter obtained by query from the parameter index table, the noise reduction component to output the corresponding reverse sound-wave signal in the case of a query result. Correspondingly, subsequent to the step of generating a corresponding noise reduction control parameter according to a signal characteristic index of the vibration noise signal, the method further includes: recording the generated noise reduction control parameter and the vibration trigger event in the parameter index table.

In practical applications, the vibration trigger event of the terminal device is generally fixed to a limited type, so the vibration operating state responded to at different times may be associated with a same type of vibration trigger events. Then, motor control parameters of the two are consistent, and vibration noise signals generated are also consistent. If vibration noise processing is performed at different times, the steps of collecting the vibration noise signal and generating the noise reduction control parameter are required to be performed each time, which may lead to occupation of a larger number of system resources. Based on this, in this embodiment, the parameter index table may be pre-configured, and then when the vibration component enters the vibration operating state in response to the vibration trigger event, the parameter index table is queried according to the vibration trigger event. In the case of a recorded vibration trigger event, noise reduction control processing may be directly performed according to the noise reduction control parameters obtained by query. On the contrary, if the current vibration triggering event is a new vibration triggering event that has not been considered in advance, relevant operations are performed according to logic of step 201 to step 203, and after the noise reduction control parameter is generated in real time, the noise reduction control parameter and the new vibration trigger event are recorded in the parameter index table, for direct invocation when the new vibration trigger event occurs again, which can effectively reduce the burden of data processing and occupation of system resources.

In some examples of this embodiment, subsequent to the step of controlling, according to the noise reduction control parameter, the noise reduction component to output a corresponding reverse sound-wave signal, the method further includes: controlling the noise reduction component to collect a superposed signal of the reverse sound-wave signal and the vibration noise signal; matching a signal characteristic index of the superposed signal with an ideal signal characteristic index; performing, if the matching is successful, the step of associatively recording the generated noise reduction control parameter and the vibration trigger event in the parameter index table; adjusting, if the matching fails, the noise reduction control parameter according to a difference parameter between the signal characteristic index of the superposed signal and the ideal signal characteristic index; and recording the adjusted noise reduction control parameter and the vibration trigger event in the parameter index table.

In practical applications, if the noise reduction control parameter is determined based on an ideal example scenario, there may be situations where an actually outputted reverse sound-wave signal cannot effectively offset the vibration noise signal. Then, in this embodiment, real-time detection may be performed on the sound field offset effect. If a signal characteristic index of an actual superposed signal collected by the noise reduction component is inconsistent with an ideal signal characteristic index in an effective sound field offset state, it indicates that the sound field offset effect is not good, and an active adjustment mechanism is further triggered in this embodiment, that is, the noise reduction control parameter previously used for sound field offset is adaptively adjusted by using a difference parameter between the signal characteristic index of the superposed signal and the ideal signal characteristic index, and then the adjusted accurate noise reduction control parameter and the vibration trigger event are recorded in the parameter index table, to ensure the sound field offset effect during subsequent noise reduction control in response to the vibration trigger event.

Figure 3:
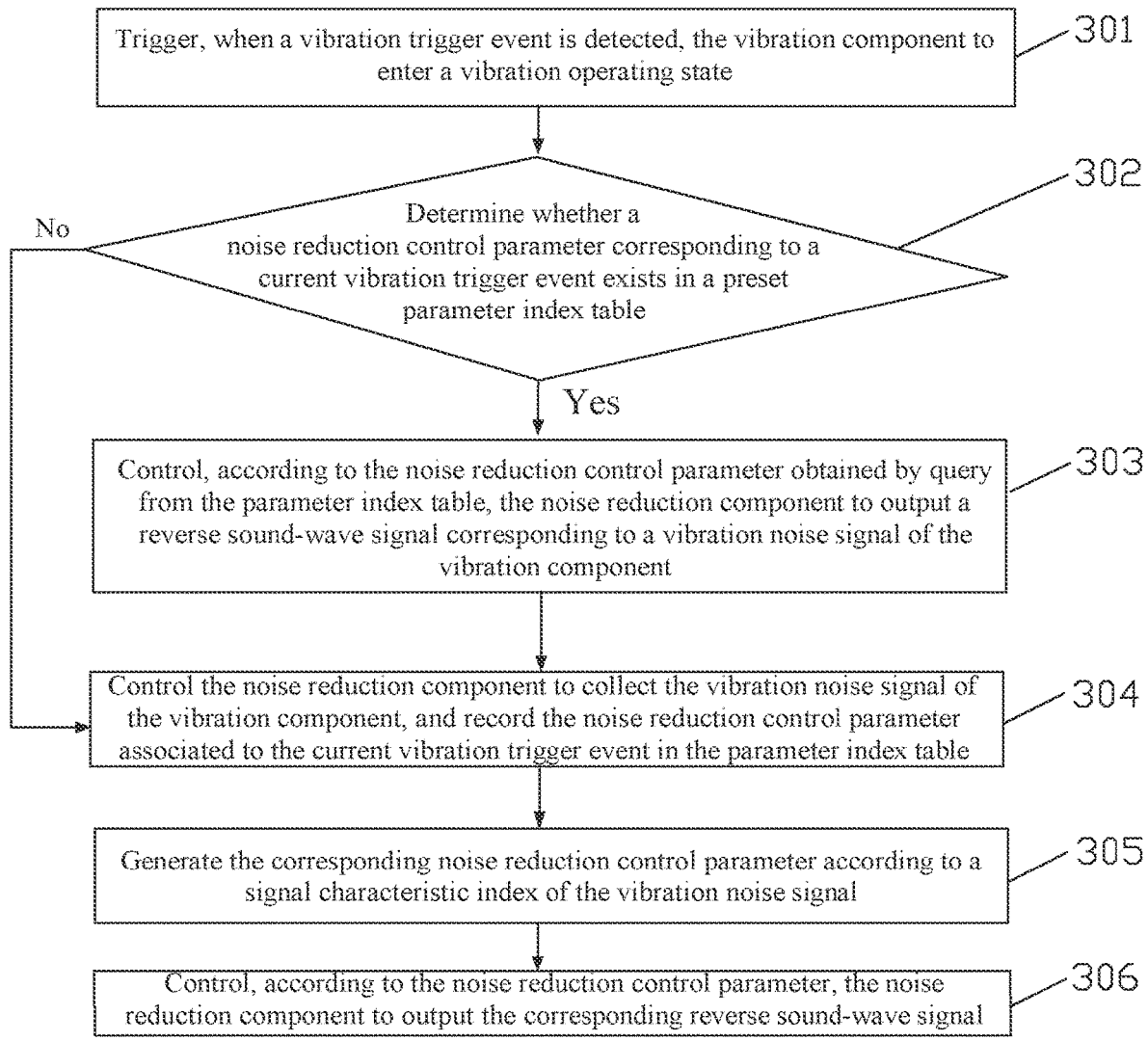
FIG. 3 is a schematic diagram of a detailed process of a vibration noise processing method according to a second embodiment of the present disclosure.

In order to better understand the present disclosure, in a second embodiment of the present disclosure, a detailed vibration noise processing method is provided. FIG. 3 is a schematic flowchart of a detailed vibration noise processing method provided in this embodiment. The vibration noise processing method includes the following steps.

In step 301, when a vibration trigger event is detected, the vibration component is triggered to enter a vibration operating state.

In step 302, it is determined whether a noise reduction control parameter corresponding to a current vibration trigger event exists in a preset parameter index table; if yes, step 303 is performed; and if not, step 304 is performed.

In step 303, according to the noise reduction control parameter obtained by query from the parameter index table, the noise reduction component is controlled to output a reverse sound-wave signal corresponding to a vibration noise signal of the vibration component.

In step 304, the noise reduction component is controlled to collect the vibration noise signal of the vibration component, and the noise reduction control parameter and the current vibration trigger event are recorded in the parameter index table.

In step 305, the corresponding noise reduction control parameter is generated according to a signal characteristic index of the vibration noise signal.

In step 306, according to the noise reduction control parameter, the noise reduction component is controlled to output the corresponding reverse sound-wave signal.

It should be understood that order of the steps in this embodiment does not mean actual execution sequences. The execution sequences of the steps should be determined based on functions and internal logic thereof, and should not constitute an only limitation on the implementation process of the embodiments of the present disclosure.

Figure 4:
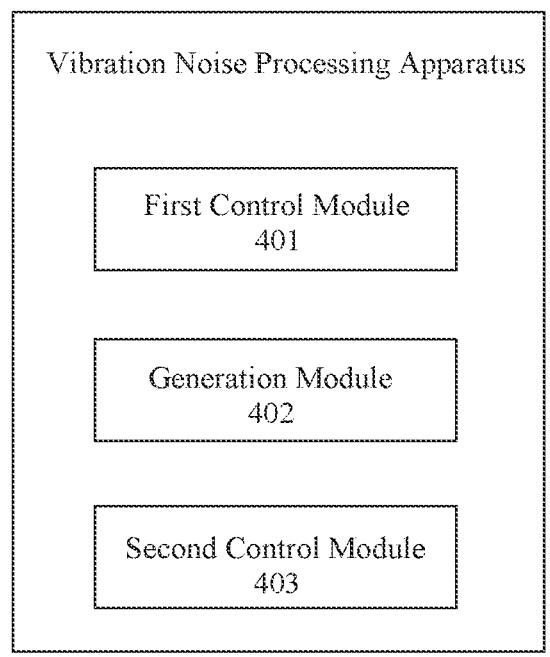
FIG. 4 is a schematic diagram of program modules of a vibration noise processing apparatus according to a third embodiment of the present disclosure.

In a third embodiment of the present disclosure, a vibration noise processing apparatus is provided. The vibration noise processing apparatus is applied to a terminal device. The terminal device is provided with a vibration component and a noise reduction component. As shown in FIG. 4, the vibration noise processing apparatus mainly includes: a first control module 401 configured to control, when the vibration component is in a vibration operating state, the noise reduction component to collect a vibration noise signal of the vibration component; a generation module 402 configured to generate a corresponding noise reduction control parameter according to a signal characteristic index of the vibration noise signal; and a second control module 403 configured to control, according to the noise reduction control parameter, the noise reduction component to output a corresponding reverse sound-wave signal. Frequencies and amplitudes of the reverse sound-wave signal and the vibration noise signal are equal, and phases of the reverse sound-wave signal and the vibration noise signal are opposite.

In an optional example of this embodiment, the vibration noise processing apparatus further includes: a trigger module configured to trigger, when a vibration trigger event is detected, the vibration component to enter the vibration operating state. Further, in an optional example of this embodiment, the trigger module is specifically configured to generate, when a touch event inputted for a touch screen is detected, the vibration control signal based on a mechanical signal corresponding to the touch event; and trigger, based on the vibration control signal, the vibration component to enter the vibration operating state.

In an optional example of this embodiment, the vibration noise processing apparatus further includes: an acquisition module and a determination module. The acquisition module is configured to acquire a vibration trigger event that triggers the vibration component to enter the vibration operating state. The determination module is configured to determine, based on the vibration trigger event, whether a preset noise reduction control condition is met. Correspondingly, the first control module is configured to control the noise reduction component to collect the vibration noise signal of the vibration component if the noise reduction control condition is met.

In an optional example of this embodiment, the generation module is configured to compare the signal characteristic index of the vibration noise signal with a preset critical signal characteristic index; and generate the corresponding noise reduction control parameter according to the signal characteristic index if the signal characteristic index exceeds the critical signal characteristic index.

In an optional example of this embodiment, the vibration noise processing apparatus further includes: a query module and a recording module. The acquisition module is further configured to acquire a vibration trigger event that triggers the vibration component to enter the vibration operating state. The query module is configured to query a preset parameter index table based on the vibration trigger event. The parameter index table includes a mapping relationship between noise reduction control parameters and vibration trigger events. The first control module is configured to control the noise reduction component to collect the vibration noise signal of the vibration component in the case of no query result. The second control module is further configured to control, according to the noise reduction control parameter obtained by query from the parameter index table, the noise reduction component to output the corresponding reverse sound-wave signal in the case of a query result. The recording module is configured to record the generated noise reduction control parameter and the vibration trigger event in the parameter index table.

In an optional example of this embodiment, the vibration noise processing apparatus further includes: a matching module and an adjustment module. The first control module is further configured to control the noise reduction component to collect a superposed signal of the reverse sound-wave signal and the vibration noise signal. The matching module is configured to match a signal characteristic index of the superposed signal with an ideal signal characteristic index. The recording module is configured to associatively record, if the matching is successful, the generated noise reduction control parameter and the vibration trigger event in the parameter index table. The adjustment module is configured to adjust, if the matching fails, the noise reduction control parameter according to a difference parameter between the signal characteristic index of the superposed signal and the ideal signal characteristic index. The recording module is further configured to record the adjusted noise reduction control parameter and the vibration trigger event in the parameter index table.

It should be noted that the vibration noise processing methods in the first and second embodiments may both be implemented based on the vibration noise processing apparatus provided in this embodiment. Those of ordinary skill in the art can clearly understand that, for the convenience and simplicity of description, a specific operating process of the vibration noise processing apparatus described in this embodiment may be obtained with reference to the corresponding process in the foregoing method embodiments. Details are not described herein again.

Based on the above technical solution provided in the embodiments of the present disclosure, when the vibration component is in a vibration operating state, the noise reduction component is controlled to collect a vibration noise signal of the vibration component. A corresponding noise reduction control parameter is generated according to a signal characteristic index of the vibration noise signal; and according to the noise reduction control parameter, the noise reduction component is controlled to output a corresponding reverse sound-wave signal. The frequencies and amplitudes of the reverse sound-wave signal and the vibration noise signal are equal, and phases of the reverse sound-wave signal and the vibration noise signal are opposite. Through example of the present disclosure, according to a vibration noise signal actually generated by the vibration component, the noise reduction component is controlled to output the corresponding reverse sound-wave signal to offset vibration noise in a sound field, which prevents sound interference caused by vibration noise to end users, meets requirements on vibration experience of the end users, and ensures provision of better auditory comfort experience for the users.

Figure 5:
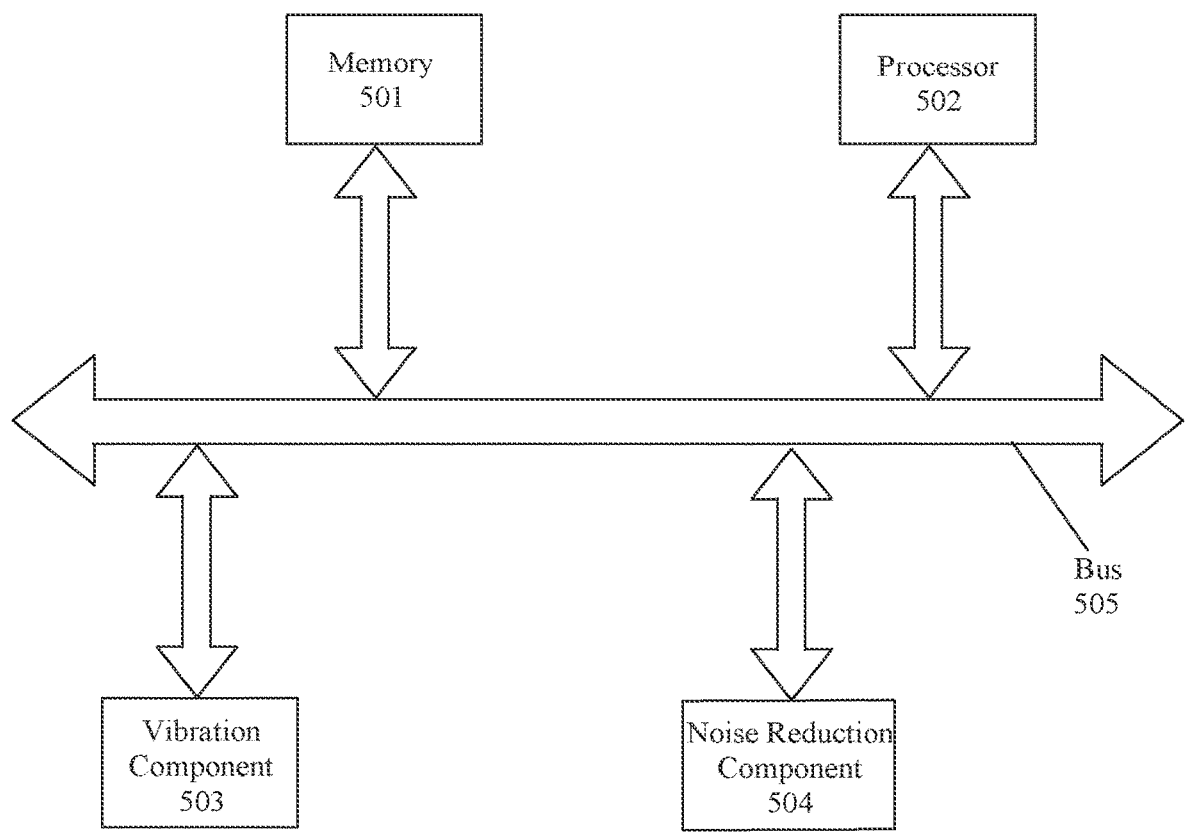
FIG. 5 is a schematic diagram of a hardware structure of a terminal device according to a fourth embodiment of the present disclosure.

Referring to FIG. 5, FIG. 5 shows a terminal device according to a fourth embodiment of the present disclosure. The terminal device may be configured to implement the vibration noise processing method in the foregoing embodiments. As shown in FIG. 5, the terminal device mainly includes: a memory 501, a processor 502, a vibration component 503, a noise reduction component 504, and a bus 505. The memory 501, the processor 502, the vibration component 503, and the noise reduction component 504 are connected through the bus 505. A computer program executable by the processor 502 is stored in the memory 501. When executing the computer program, the processor 502 implements the vibration noise processing method in the foregoing embodiments. One or more processors may be provided.

The memory 501 may be a high-speed random access memory (RAM), or may be a non-volatile memory such as a magnetic disk memory. The memory 501 is configured to store executable program codes, and the processor 502 is coupled to the memory 501.

Further, an embodiment of the present disclosure further provides a computer-readable storage medium. The computer-readable storage medium may be arranged in the terminal device in the above embodiments. The computer-readable storage medium may be the memory in the embodiment shown in FIG. 5 above.

The computer-readable storage medium stores a computer program. When the program is executed by a processor, the vibration noise processing method in the foregoing embodiments is implemented. Further, the computer-readable storage medium may alternatively be any medium that can store program code such as a USB flash disk, a mobile hard disk, a read-only memory (ROM), a RAM, a magnetic disk, or an optical disc.

In the several embodiments provided in the present disclosure, it should be understood that the apparatus and method disclosed may be implemented in other manners. For example, the apparatus embodiments described above are only illustrative. For example, the division of the modules is merely logical function division, and there may be other division manners in an actual example. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between apparatuses or modules may be implemented in an electric form, a mechanical form, or other forms.

The modules described as separate parts may or may not be physically separate, and parts displayed as modules may or may not be physical modules, may be located at one position, or may be distributed on a plurality of network modules. Some or all of the modules may be selected according to actual requirements to achieve the objective of the solution of this embodiment.

In addition, the functional modules in the embodiments of the present disclosure may be integrated into one processing module, or each of the modules may exist alone physically, or two or more modules are integrated into one module. The integrated module may be implemented in a form of hardware or in a form of a software functional module.

The integrated module may be stored in a computer-readable storage medium when implemented in the form of the software functional module and sold or used as a separate product. Based on such an understanding, the technical solutions in the present disclosure essentially, or the part contributing to the related art, or some of the technical solutions may be implemented in the form of a software product. The computer software product is stored in a readable storage medium, and includes several instructions for causing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, it can be referred to related descriptions in other embodiments.

The above are descriptions about the vibration noise processing method and apparatus, the device, and the readable storage medium provided in the present disclosure. For those skilled in the art, there may be changes in specific embodiments and an application scope based on the ideas of the embodiments of the present disclosure. In summary, the content of this specification should not be understood as limitations on the present disclosure.

What is claimed is:

1. A vibration noise processing method, applied to a terminal device comprising a vibration component and a noise reduction component, wherein the method comprises:
   controlling, when the vibration component is in a vibration operating state, the noise reduction component to collect a vibration noise signal of the vibration component;
   generating a corresponding noise reduction control parameter according to a signal characteristic index of the vibration noise signal; and
   controlling, according to the noise reduction control parameter, the noise reduction component to output a corresponding reverse sound-wave signal, wherein the reverse sound-wave signal has a frequency and an amplitude identical to the vibration noise signal, and the reverse sound-wave signal has a phase opposite to the vibration noise signal; wherein
   prior to the controlling the noise reduction component to collect a vibration noise signal of the vibration component, the method further comprises:
   acquiring a vibration trigger event that triggers the vibration component to enter the vibration operating state;
   querying a preset parameter index table based on the vibration trigger event, wherein the parameter index table comprises a mapping relationship between noise reduction control parameters and vibration trigger events;
   performing the controlling the noise reduction component to collect a vibration noise signal of the vibration component in response to no query result acquired; and
   controlling, according to the noise reduction control parameter obtained by query from the preset parameter index table, the noise reduction component to output the corresponding reverse sound-wave signal in response to a query result acquired; and
   subsequent to the generating a corresponding noise reduction control parameter according to a signal characteristic index of the vibration noise signal, the method further comprises:
   recording the generated noise reduction control parameter associated with the vibration trigger event in the parameter index table;
   subsequent to the controlling, according to the noise reduction control parameter, the noise reduction component to output a corresponding reverse sound-wave signal, the method further comprises:
   controlling the noise reduction component to collect a superposed signal of the reverse sound-wave signal and the vibration noise signal;
   matching a signal characteristic index of the superposed signal with an ideal signal characteristic index;
   performing, when the matching is successful, the recording the generated noise reduction control parameter associated with the vibration trigger event in the parameter index table;
   adjusting, when the matching fails, the noise reduction control parameter according to a difference parameter between the signal characteristic index of the superposed signal and the ideal signal characteristic index; and
   recording the adjusted noise reduction control parameter associated with the vibration trigger event in the parameter index table.

2. The vibration noise processing method as described in claim 1, wherein prior to the controlling the noise reduction component to collect a vibration noise signal of the vibration component, the method further comprises:
   triggering, when a vibration trigger event is detected, the vibration component to enter the vibration operating state.

3. The vibration noise processing method as described in claim 2, wherein the triggering, when a vibration trigger event is detected, the vibration component to enter the vibration operating state comprises:
   generating, when a touch event inputted for a touch screen is detected, the vibration control signal based on a mechanical signal corresponding to the touch event; and
   triggering, based on the vibration control signal, the vibration component to enter the vibration operating state.

4. The vibration noise processing method as described in claim 1, wherein prior to the controlling the noise reduction component to collect a vibration noise signal of the vibration component, the method further comprises:
   acquiring a vibration trigger event that triggers the vibration component to enter the vibration operating state;
   determining, based on the vibration trigger event, whether a preset noise reduction control condition is met; and performing the controlling the noise reduction component to collect a vibration noise signal of the vibration component in response to the noise reduction control condition being met.

5. The vibration noise processing method as described in claim 1, wherein the generating a corresponding noise reduction control parameter according to a signal characteristic index of the vibration noise signal comprises:

comparing the signal characteristic index of the vibration noise signal with a preset critical signal characteristic index; and generating the corresponding noise reduction control parameter according to the signal characteristic index in response to the signal characteristic index exceeding the critical signal characteristic index.

* * * * *